US007302984B2

(12) United States Patent
Mitsui et al.

(10) Patent No.: US 7,302,984 B2
(45) Date of Patent: Dec. 4, 2007

(54) LOCK MECHANISM OF SLIDING MEMBER AND TRANSFER DEVICE

(75) Inventors: Takashi Mitsui, Osaka (JP); Hideto Shima, Kyoto (JP)

(73) Assignee: Kokuyo Co., Ltd. (JP)

( * ) Notice: Subject to any disclaimer, the term of this patent is extended or adjusted under 35 U.S.C. 154(b) by 354 days.

(21) Appl. No.: 11/006,662

(22) Filed: Dec. 8, 2004

(65) Prior Publication Data

US 2005/0139326 A1 Jun. 30, 2005

(30) Foreign Application Priority Data

Dec. 26, 2003 (JP) .......................... P2003-435240

(51) Int. Cl.
*B65H 35/07* (2006.01)
*B32B 37/26* (2006.01)
*B43L 19/00* (2006.01)

(52) U.S. Cl. ...................... 156/577; 156/523; 156/579; 118/76; 242/160.4; 242/171; 242/588.6

(58) Field of Classification Search ................ 156/523, 156/527, 538, 540, 574, 577, 579; 118/76, 118/200, 257; 225/46; 242/160.2, 160.4, 242/170, 171, 588, 588.2, 588.3, 588.6; 206/411
See application file for complete search history.

(56) References Cited

U.S. PATENT DOCUMENTS 5,346,580 A * 9/1994 Elges et al. ................. 156/540
5,942,036 A * 8/1999 You .......................... 118/257
6,000,455 A * 12/1999 Semmler .................... 156/540
2004/0149392 A1* 8/2004 Casaldi et al. ............. 156/574

FOREIGN PATENT DOCUMENTS

JP 2002-144790 A 5/2002

* cited by examiner

*Primary Examiner*—Mark A Osele
(74) *Attorney, Agent, or Firm*—Banner & Witcoff, Ltd.

(57) ABSTRACT

A lock mechanism of a sliding member being slidably movable along a body between an engaged position and a pullout position. The sliding member comprises a face, the face contacting along an outer face of the body in a direction of sliding. The lock mechanism comprises an engaging portion located between the body and the sliding member that prohibits the sliding member from sliding by holding the sliding member at the engaged position by a concavo-convex engagement, and an engagement release mechanism that releases the engaging portion, when an operating force is applied to an operating portion located on the sliding member, to allow the sliding member to slide from the engaged position to the pullout position along a sliding direction and in a direction different from the sliding direction simultaneously. The operating force including components parallel to and orthogonal to the contacting face.

20 Claims, 10 Drawing Sheets

(a)

(b)

(a)

(b)

(a)

(b)

(c)

(d)

LOCK MECHANISM OF SLIDING MEMBER AND TRANSFER DEVICE

BACKGROUND OF THE INVENTION AND RELATED ART STATEMENT

This invention relates to a lock mechanism that holds a sliding member that is mounted on a body as being an object to be mounted in a slidably movable manner between a predetermined engage position and a pullout position and a transfer device that makes use of the lock mechanism.

Various transfer devices that are used in case of transferring a transferring material such as a tape like an adhesive tape or a non-adhesive tape, a solid or liquid paste or a binding agent to a face to which the transferring material is to be transferred have been conceived. Some of the transfer devices are so arranged that a holder holding a transferring material comprises a body case and a cartridge holding the transferring material wherein the holder and the cartridge can be split. In accordance with this arrangement, the holder is split into the cartridge and the body case and the cartridge holding the used transferring material is exchanged with a cartridge holding a new transferring material after all of the transferring material is used up. (For example, refer to patent document 1) This arrangement has a lock mechanism that comprises two engaging bores that are formed on a side face of the body case, and two engaging nails that can be engaged with the engaging bores formed at both distal ends of a horseshoe shaped band constituting side faces of the cartridge wherein the cartridge can be engaged with the body case by engaging the engaging nails with the engaging bores. In order to exchange the cartridge, first, portions near the distal ends of the horseshoe shaped band are held by multiple fingers of one hand and the engaging nails are moved inward so as to release an engaged state of the engaging nails and the engaging bores, which releases the engaged state of the body case and the cartridge, and next, the cartridge is slid relative to the body case so as to separate the cartridge from the body case. (Patent document 1) Japan patent laid open number 2002-144790 (FIG. 1)

With the transfer device of the above-mentioned arrangement, it is required to hold the cartridge tightly from outer sides of the engaging nails in order to move the engaging nails arranged at two portions inward when the cartridge is dismounted from the body case. More specifically, the above-mentioned operation may not be conducted if it is not possible to hold the cartridge between fingers such that only a single finger is free.

This kind of problems may happen to general cases wherein the lock mechanism of the above-mentioned arrangement is used such that a cover body is mounted on a body case as being an object to be mounted in a slidably movable state.

The present claimed invention intends to provide a lock mechanism that can hold a member mounted on a body in a slidably movable state at a predetermined engaged position and the member can be allowed to make a sliding movement with a simple operation by a finger and a transfer device to which the lock mechanism is applied.

SUMMARY OF THE INVENTION

The lock mechanism of a sliding member in accordance with this invention comprises a body and a sliding member mounted between a predetermined engaged position and a pullout position in a slidably movable manner with contacting along the body, and is characterized by comprising an engaging portion that is arranged between the body and the sliding member and that prohibits the sliding member from making a sliding movement so as to hold the sliding member at the engaged position by making use of a concavo-convex engagement and an engagement release mechanism that releases the engaged state of the engaging portion so as to allow the sliding member to make a sliding movement by applying an operating force to an operating portion arranged on only one location of the sliding member from the engaged position toward the pullout position along a direction of a sliding movement and toward a direction different from the direction of the sliding movement simultaneously.

In accordance with the lock mechanism of the above-mentioned arrangement, since an operating portion that receives an operating force to actuate the engagement release mechanism and an operating force to slidably move the sliding member is arranged at only one location, it is possible for a user to do successive operations to release the engaged state of the engaging portion so as to allow the sliding member to make a sliding movement and to move the sliding member to slide consecutively with one finger by actuating the engagement release mechanism with applying an operating force toward a direction of the sliding movement from the engaged position to the pullout position and a direction different from the direction of the sliding movement at once. More specifically, it is possible to operate the sliding member without grasping to pinch the body even though it is not possible to grasp to pinch the body because only one finger is free.

As an arrangement to obtain the effect of operating the sliding member more easily it is represented that the sliding member has a contacting portion having a contacting face to contact along the body and a standing portion arranged to stand from an end edge of the contacting portion wherein a distal end of the standing portion projects over the body and the operating portion is formed at the distal end of the standing portion. In accordance with this arrangement, it is possible to operate the operating portion with a finger so as to apply an action to the operating portion toward a direction orthogonal to the contacting face. In addition, since the sliding member rotates around an end portion of an opposite side to the side where the standing portion of the contacting plate portion is arranged due to this action, it is possible to release the concavo-convex engagement of the engaging portion with a little operating force.

As one example to which the lock mechanism of the sliding member can be applied, a transfer device to transfer a transferring material such as a binding agent or a correction tape to an object to which the transferring material is to be transferred is represented. More specifically, the transfer device comprises a body having a cartridge that holds a transferring material to be transferred on an object on which the transferring material is to be transferred and a transfer head to make the transferring material contact with the object and a case that accommodates the cartridge, and a sliding member mounted between a predetermined engaged position and a pullout position in a slidably movable manner with contacting along the case of the body, and characterized by further comprising a lock mechanism of the sliding member having an engaging portion that is arranged between the case of the body and the sliding member and that prohibits the sliding member from making a sliding movement so as to hold the sliding member at the engaged position by making use of a concavo-convex engagement and an engagement release mechanism that releases the engaged state of the engaging portion so as to allow the sliding member to make a sliding movement by applying an operating force to an operating portion arranged on only one location of the sliding member from the engaged position toward the pullout position along a direction of a sliding movement and toward a direction different from the direction of the sliding movement simultaneously.

In accordance with the lock mechanism of the above-mentioned arrangement, since an operating portion that receives an operating force to actuate the engagement release mechanism and an operating force to slidably move the sliding member is arranged at only one location, it is possible for a user to do successive operations to release the engaged state of the engaging portion so as to allow the sliding member to make a sliding movement with one finger by actuating the engagement release mechanism with applying an operating force toward a direction of the sliding movement from the engaged position to the pullout position and a direction different from the direction of the sliding movement at once. More specifically, it is possible to operate the sliding member without grasping to pinch the body even though it is not possible to grasp to pinch the body because only one finger is free.

If the lock mechanism further comprises a separating mechanism that is arranged between the cartridge of the body and the sliding member and that separates the cartridge from the case in conjunction with the sliding movement of the sliding member from the engaged position to the pullout position, it is possible to operate the sliding member to make a sliding movement so as to separate the cartridge from the case with one finger.

As an arrangement to obtain an effect to facilitate an operation of the above-mentioned sliding member more preferably it is represented that the sliding member has a contacting portion having a contacting face to contact along the case of the body and a standing portion arranged to stand from an end edge of the contacting portion toward a direction of the cartridge wherein a distal end of the standing portion projects over the cartridge and the operating portion is formed at the distal end of the standing portion. In accordance with the arrangement, it is possible to operate the operating portion with a finger so as to apply an action to the operating portion toward a direction orthogonal to the contacting face. In addition, since the sliding member rotates around an end portion of an opposite side to the side where the standing portion of the contacting plate portion is arranged due to this action, it is possible to release the concavo-convex engagement of the engaging portion with a little operating force.

As a concrete arrangement to form the above-mentioned engaging portion with ease it is represented that the engaging portion comprises an engaging bore formed on the sliding member and an engaging projection formed on the case to project outward at a position corresponding to the engaging bore.

Especially, if the engaging projection is formed in such a shape that a projecting width of the engaging projection is narrowed from a center of a direction of the sliding movement toward both ends, it is possible to prevent the engaging projection from interfering the sliding member with moving when the operational force is applied to the operating portion.

Furthermore, if the engaging projection is formed to be in such a shape that a projecting width of the engaging projection is narrowed toward a circumference of the engaging projection, it is possible to lessen a material required to form the engaging projection.

In addition, as another arrangement to prevent a problem that the engaging projection interferes the sliding member with moving when an operational force is applied to the operating portion, it is represented that the engaging projection is elastically supported by one side of an outside panel forming an outer face of the case. In accordance with this arrangement, the engaging projection moves toward a direction separated from the sliding member in conjunction with the sliding movement of the sliding member when an opening end edge of the engaging bore makes an abutting contact with the engaging projection.

As an example of a concrete arrangement of the engagement release mechanism it is represented that the engagement release mechanism is so arranged to function to release the engaged state of the engaging portion so as to allow the sliding member to make a sliding movement from the engaged position toward the pullout position by separating at least a part of the sliding member from the case both outward and toward a direction orthogonal to the contacting face that contacts along the case of the body when the operating portion receives the operating force.

Especially, if the engagement release mechanism makes use of a bending transformation of the sliding member, there is no need of providing a special mechanism to slide the sliding member to a direction orthogonal to the contacting face, thereby to facilitate designing and manufacturing the transfer device.

As an arrangement to make the sliding member easy to transform to bend, it is represented that the contacting portion of the sliding member is a plate shaped contacting plate portion and comprises a base portion locating at a position contrary to a side where the operating portion is arranged, and an enlarged portion that is formed continuously to the base portion and a width of which is bigger than that of the base portion, and the engagement release mechanism makes use of an outward movement of the enlarged portion by bending transformation of a boundary portion between the enlarged portion and the base portion. In accordance with this arrangement, the sliding member is easily bent at the boundary portion between the enlarged portion and the base portion.

Especially, if the engaging portion is arranged at the enlarged portion side, since the enlarged portion is separated from the body toward a direction orthogonal to the contacting force by a small operational force, it is possible to release the engaged state of the engaging portion with a small operational force.

As an arrangement to effectively prevent a problem that the sliding member moves toward a direction orthogonal to the contacting face that contacts the case so as to be detached from the contacting face, it is represented that the lock mechanism further comprises a second engaging portion arranged between the cartridge of the body and the sliding member to prohibit the sliding member from moving toward a direction orthogonal to the contacting face that contacts along the case so as to hold the sliding member at the engaged position by making use of a concavo-convex engagement and the engaged state of the engaging portion and the engaged state of the second engaging portion are released at the same time when the operating portion receives an operating force toward a direction of a sliding movement from the engaged position toward the pullout position and an operating force toward a direction different from the direction of the sliding movement at once. In accordance with the arrangement, since the above-mentioned problem can be avoided due to a performance of the second engaging portion and the engaged state of the second engaging portion can be released simultaneously with an operation to release the engaged state of the engaging portion, a consecutive operation to slide the sliding member from a state held at the engaged position to a pullout position.

As one example of the arrangement that can form the second engaging portion with ease, it is represented that the second engaging portion comprises an engaging nail formed to project outward relative to an outer face of the cartridge of the body and a second engaging bore formed on the sliding member to be able to be engaged with or disengaged from the engaging nail.

DETAILED DESCRIPTION OF THE PREFERRED EMBODIMENTS

An embodiment of the present claimed invention will be described in detail with reference to the accompanying drawings.

Figure 1:
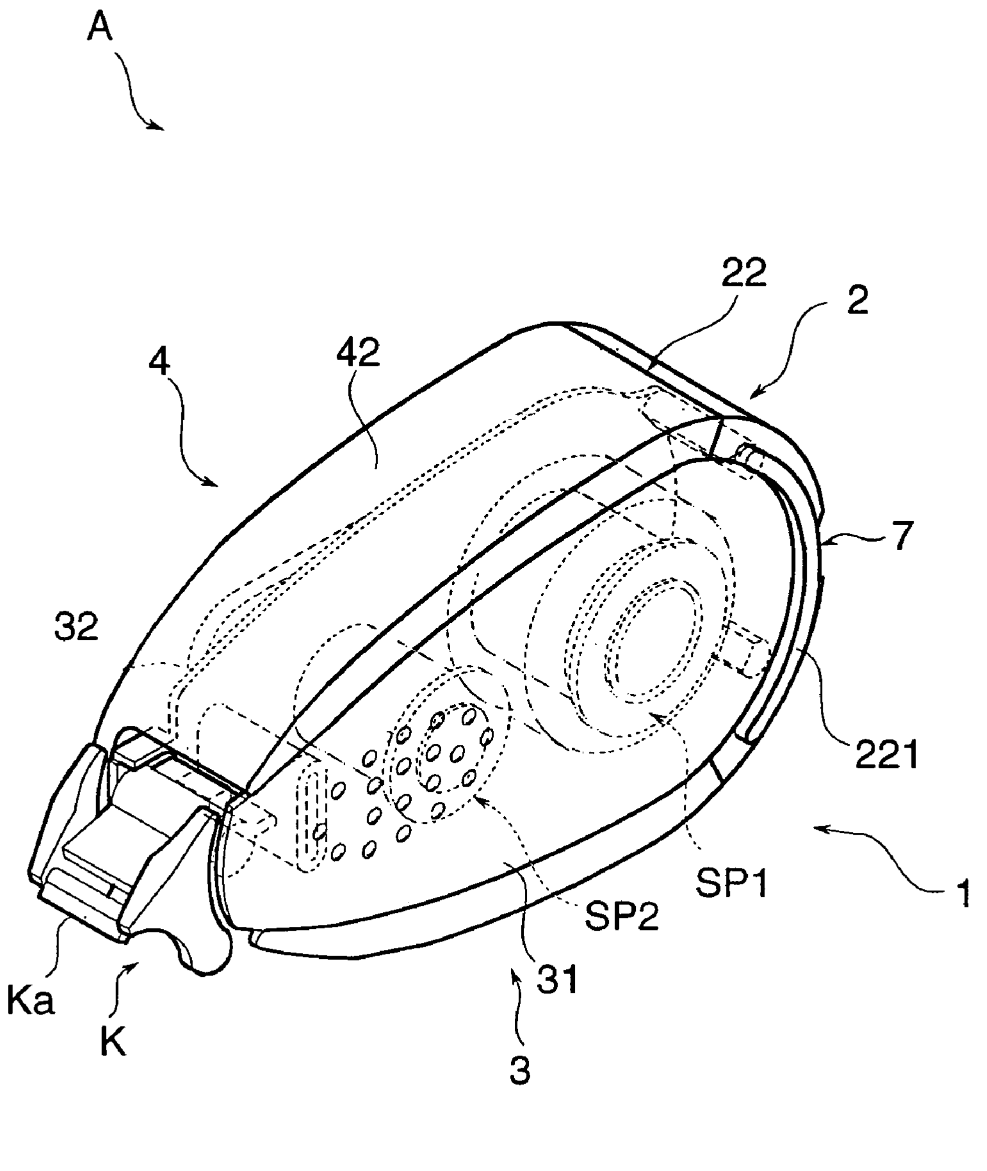
FIG. 1 is a perspective view showing a transfer device in accordance with one embodiment of the present claimed invention.
Figure 2:
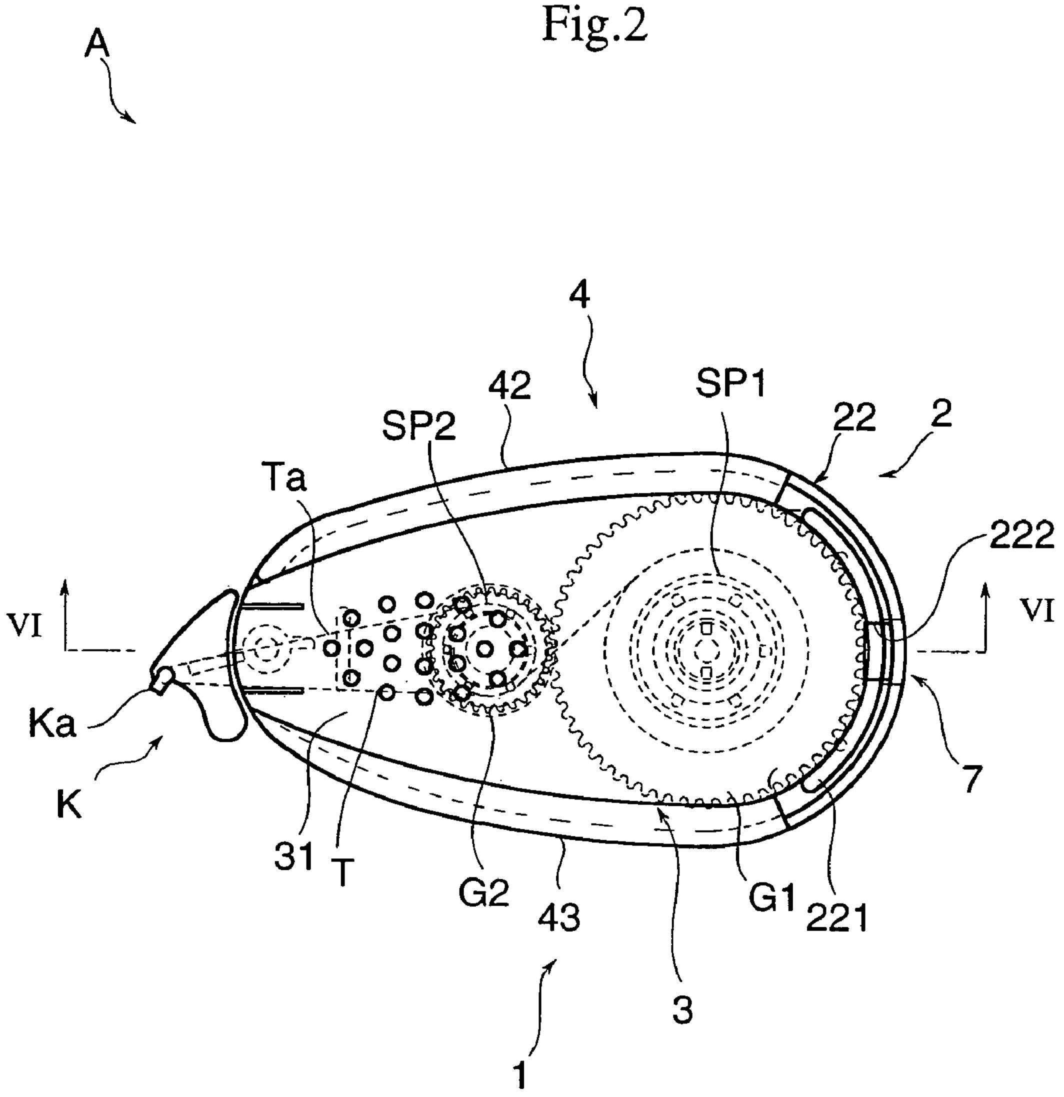
FIG. 2 is a right side view of the transfer device in accordance with the embodiment.
Figure 3:
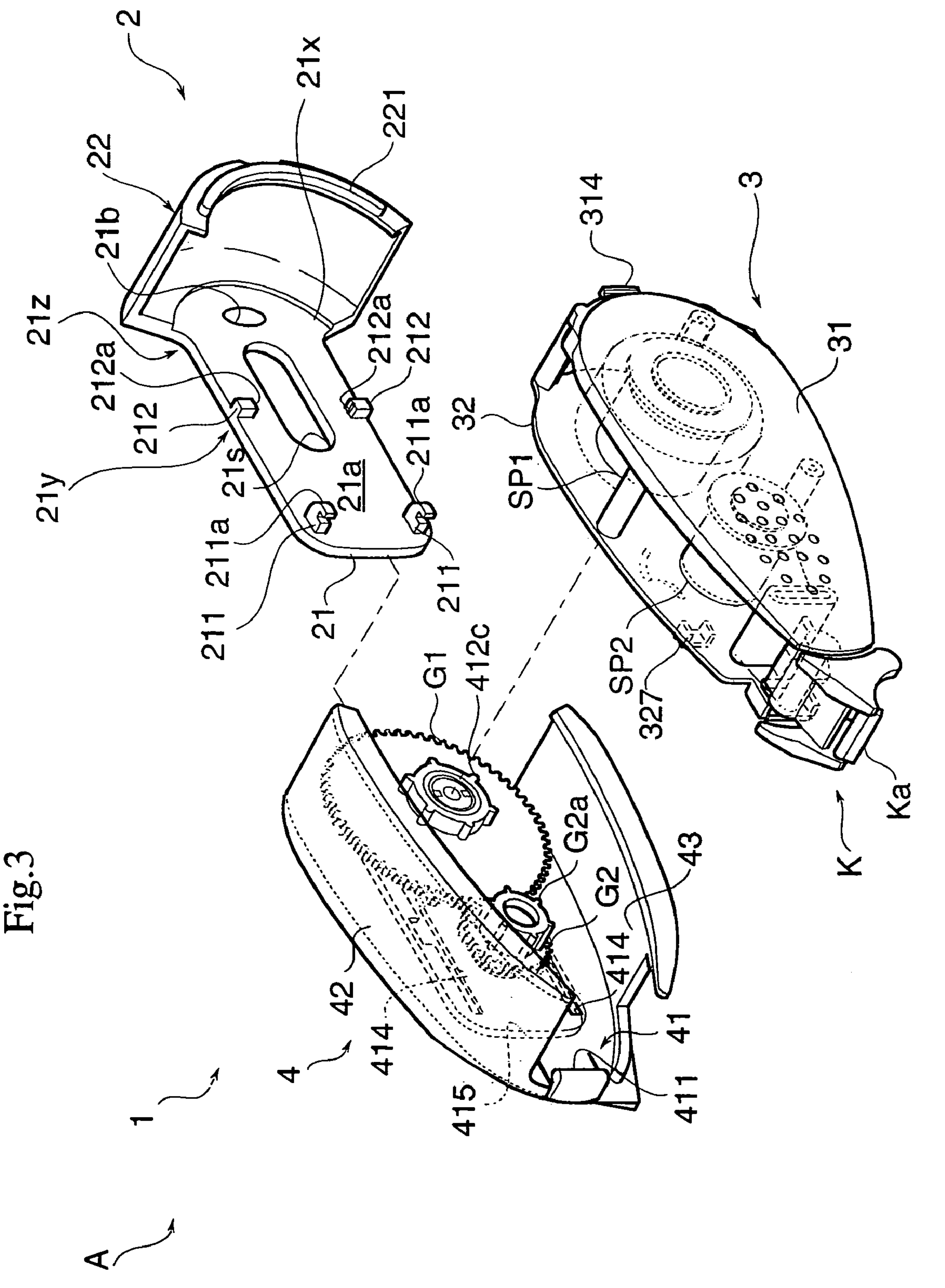
FIG. 3 is an exploded perspective view of the transfer device in accordance with the embodiment.
Figure 4:
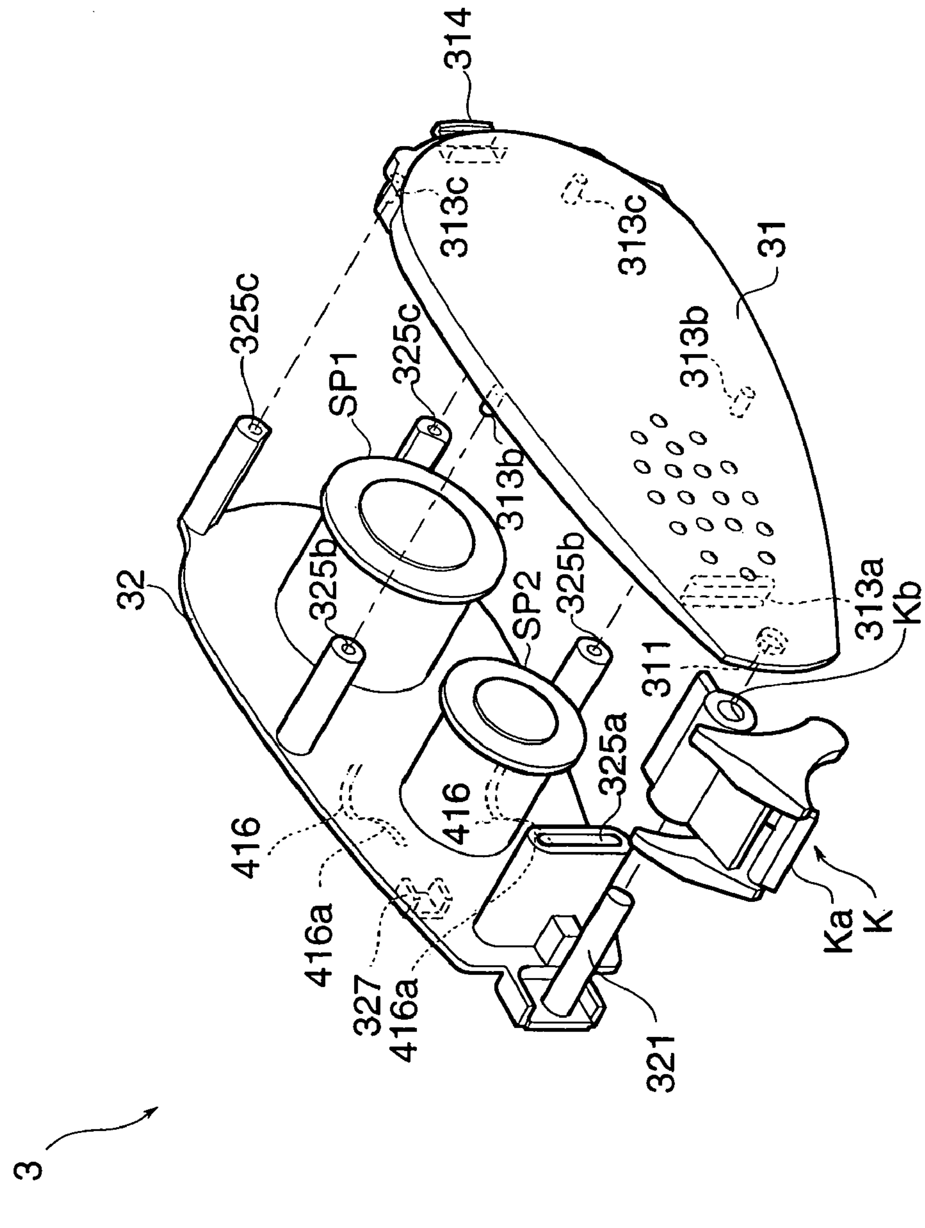
FIG. 4 is an exploded perspective view showing a cartridge of the transfer device in accordance with the embodiment.

The embodiment shown in FIG. 1, FIG. 2 and FIG. 3 is a transfer device A that accommodates a tape T comprising a tape body Ta and a transfer paste, not shown in drawings, as being a transferring material that is adhered to a single face of the tape body Ta in a predetermined pattern, and is used for transferring the transfer paste on an object on which the transfer paste is to be transferred such as paper.

Figure 5:
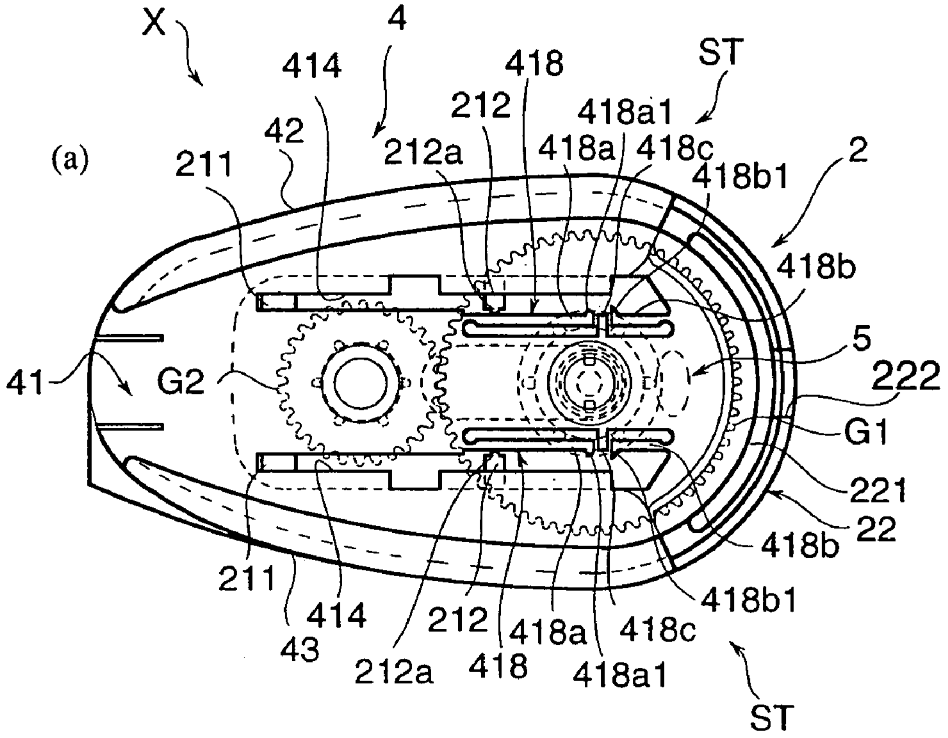
FIG. 5(*a*) and FIG. 5(*b*) are inner side views showing a case and a sliding member of the transfer device in engaged and pull-out positions, respectively, in accordance with the embodiment.
Figure 5:
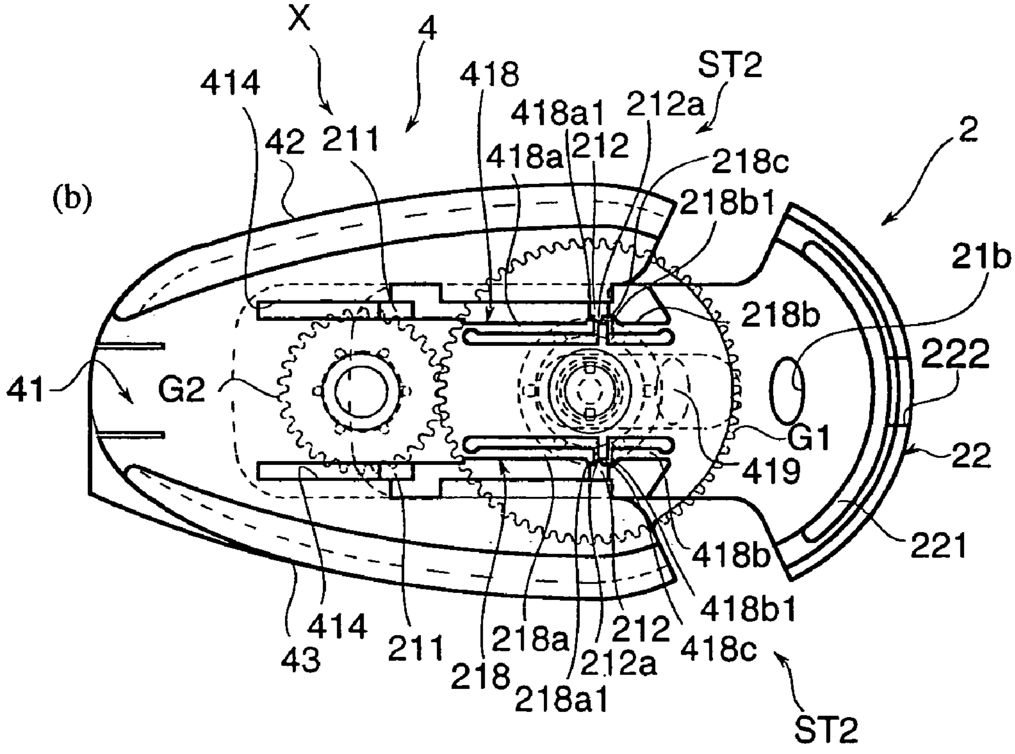
Figure 7:
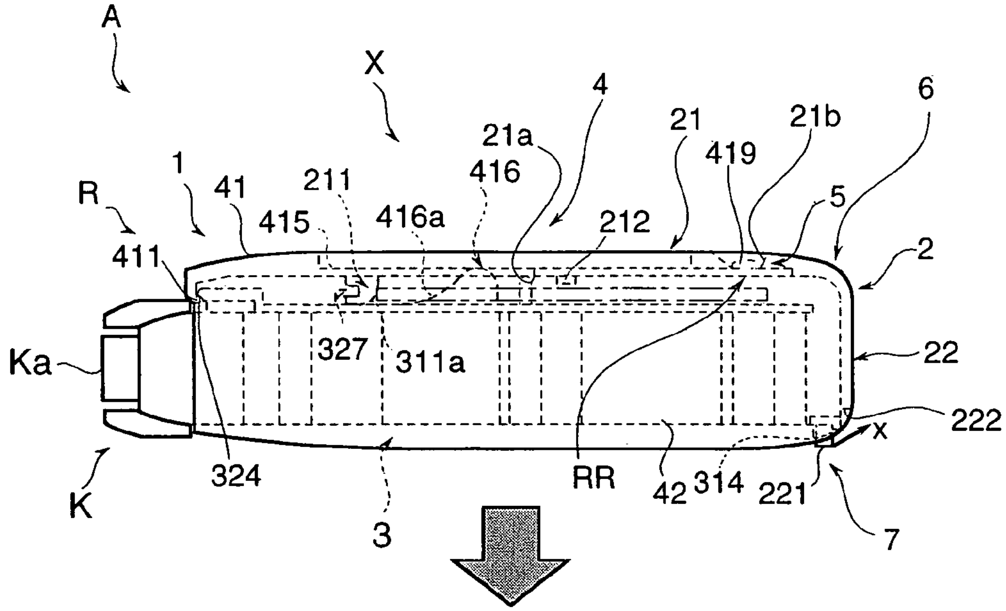
FIG. 7(*a*) and FIG. 7(*b*) are explanatory views of engaged and pull-out positions, respectively, of an operation in accordance with the embodiment.
Figure 7:
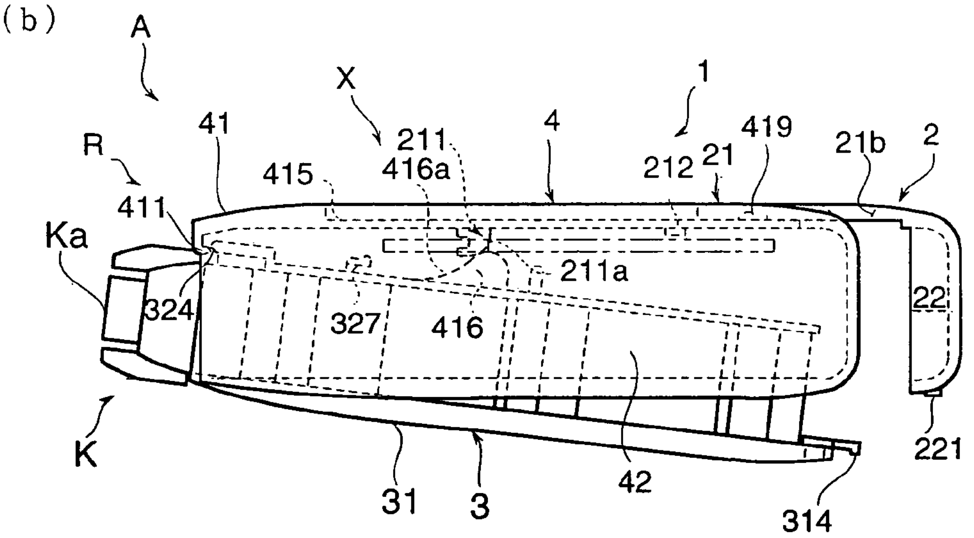

The transfer device A comprises a body 1 inside of which the tape T can be accommodated, and a sliding member 2 that has an elasticity and that is mounted in a state of contacting along the body 1 between a predetermined engaged position shown in FIG. 5(*a*) and FIG. 7(*a*) and a pullout position shown in FIG. 5(*b*) and FIG. 7(*b*) in a slidably movable manner. Further, the body 1 has a generally halved arrangement comprising two members, one of which is a cartridge 3, and the other of which is a case 4 that accommodates the cartridge 3. A used tape T can be exchanged to a new tape T by assembling or disassembling the cartridge 3 and the case 4. In order to do this, the transfer device A further comprises a separating mechanism X that is arranged between the cartridge 3 and the sliding member 2 and that works to separate the cartridge 3 and the case 4 in conjunction with a sliding movement of the sliding member 2 from the engaging position to the pullout position. The tape T is omitted to draw in drawings except for FIG. 2.

Next, a concrete arrangement of the body 1 in accordance with the embodiment will be described.

The cartridge 3 is, as shown in FIG. 1 through FIG. 4 and FIG. 6, to hold the tape T and a transfer head K. The tape T and the transfer head K can be exchanged together by dismounting the cartridge 3 from the case 4. More concretely, the cartridge 3 mainly comprises a first outside panel 31 as being one of outside panels of whole of the transfer device A, and an inside panel 32 arranged to face the first outside panel 31, and is so arranged to hold the tape T mounted on a wind-off spool SP1 and a roll-up spool SP2 and the transfer head K between the first outside panel 31 and the inside panel 32.

The first outside panel 31 is, for example, in a shape of a thin plate made of synthetic resin and in this embodiment, is in a general egg-shape in a side view. A receiving bore 311 that receives a distal end portion of a supporting axis 321 formed on the inside panel 32 is formed at a front end portion of the inside face of the first outside panel 31 in order to support the transfer head K. In addition, supporting concave portions 312 and 313 that support the wind-off spool SP1 and the roll-up spool SP2, which are mainly supported by the inside panel 32, respectively in a rotatable manner are formed on the inside face of the first outside panel 31.

The inside panel 32 is, for example, in a shape of a thin plate made of synthetic resin and in this embodiment, is in a general egg-shape in a side view generally corresponding to the shape of the first outside panel 31. A supporting axis 321 that can support the transfer head K in a manner of being able to swing is formed at a front end portion of the inside face of the inside panel 32 to project toward the first outside panel 31. Supporting bores 322, 323 that can support the wind-off spool SP1 and the roll-up spool SP2 respectively in a rotatable manner are formed to open at a rear end portion side and a center portion of the inside panel 32. A diameter of the supporting bore 322 for the wind-off spool SP1 is made to be larger than a diameter of the supporting bore 323 for the roll-up spool SP1 in order to correspond to each diameter of the wind-off spool SP1 and the roll-up spool SP2. Each of the wind-off spool SP1 and the roll-up spool SP2 arranged at the rear end portion side is in a cylindrical shape and supported between the inside panel 32 and the first outside panel 31 in a rotatable manner with each of one end portion thereof inserted into the supporting bores 322, 323 and each of the other end portion thereof inserted into the supporting concave portions 312, 313.

The first outside panel 31 and the inside panel 32 are in a fitting arrangement. In order to do so, a total of five small projections 313*a*, 313*b*, 313*c* are formed at an inside face of the first outside panel 31 to project inward in order to fit into the inside panel 32. More concretely, the small projection 313*a* is formed at the front end portion side of the first outside panel 31, the two small projections 313*b*, 313*b* are formed at a center portion along back and forth of the first outside panel 31 and the two small projections 313*c*, 313*c* are formed at the rear end portion side of the outside panel 31. The small projection 313*a* arranged at the front end portion side is in a shape of a thin plate and each of the other small projections 313_b_, 313_b_, 313_c_, 313_c_ is in a shape of a small column. A total of five cylindrical portions 325_a_, 325_b_, 325_b_, 325_c_, 325_c_ are formed on the inside face of the inside panel 32 to project toward the first outside panel 31 side so that the small projections 313_a_, 313_b_, 313_c_ can be inserted thereinto respectively. The cylindrical portion 325_a_ arranged at the front end portion side is in a compressed shape and each of the cylindrical portions 325_b_, 325_b_, 325_c_, 325_c_ is generally in a shape of a cylinder. Especially the two cylindrical portions 325_b_ arranged at the center portion along back and forth have a function of guiding the tape T. More specifically, the tape T is so arranged that the tape body Ta with the transfer paste passes from the wind-off spool SP1 to the distal end portion Ka of the transfer head K through the cylindrical portion 325_b_ locating at a lower side and then the tape body Ta is rolled up by the roll-up spool SP2 through the cylindrical portion 325_b_ locating at an upper side after the transfer paste is transferred.

Next, the case 4 mainly comprises, as shown in FIG. 1 ~FIG. 3, FIG. 5 and FIG. 6, a second outside panel 41 constituting an outside wall of the transfer device A in pairs with the first outside panel 31, and a pair of surrounding walls 42, 43 continuously arranged to an upper edge and a lower edge of the second outside panel 41 so as to close a space between the upper edge of the second outside panel 41 and the upper edge of the first outside panel 31 and a space between the lower edge of the second outside panel 41 and the lower edge of the first outside panel 31.

The second outside panel 41 is, for example, in a shape of a thin plate made of synthetic resin similar to the first outside panel 31 and in this embodiment, is in a general egg-shape in a side view. An unciform projection 411 is formed to project toward the inside panel 32 at the front end portion of the second outside panel 41 so as to be hooked with a cutout portion 324 formed at the front end portion of the inside panel 32. The cutout portion 324 and the unciform projection 411 form a rotary mounting portion R to mount the case 4 on the cartridge 3 rotatably. Mounting portions 412, 413 for a wind-off gear G1 with a big diameter to drive the wind-off spool SP1 and the roll-up spool SP2 and a roll-up gear G2 that gears the wind-off gear G1 and that has a diameter smaller than that of the wind-off gear G1 are arranged at an inside face of the second outside panel 41. The mounting portion 412 for the wind-off gear G1 comprises a through bore 412_a_ formed at a rear end portion of the second outside panel 41, a slack adjusting pin 412_b_ to be inserted into the through bore 412_a_, and a driving shaft 412_c_ to be mounted on the slack adjusting pin 412_b_ in a manner incapable of dropping out. A periphery of the driving shaft 412_c_ gears an inner circumference of the wind-off spool SP1 when the case 4 fits over the cartridge 3. The mounting portion 413 for the roll-up spool SP2 comprises a mounting shaft 413_a_ to be inserted into the roll-up spool SP2 when the case 4 fits over the cartridge 3 and the mounting shaft 413_a_ fits over the roll-up gear G2. The roll-up gear G2 comprises a plate-shaped gear body integrally formed with a core G2_a_ projecting toward the cartridge 3. When the transfer device A is slid toward a predetermined direction with contacting a surface of a paper or the like, the tape A held between the distal end portion Ka of the transfer head K and a face of the paper is sent out from the wind-off spool SP1 that rotates together with the wind-off gear G1 due to frictional force and the transfer paste is transferred on the face of the paper. At the same time, the roll-up spool SP2 rotates together with the roll-up gear G2 that rotates toward a counter direction in conjunction with the wind-off gear G1 and the tape body Ta is rolled up by the roll-up spool SP1 after the transferring paste is transferred. An adjusting groove, not shown in drawings, is formed at a pin head portion of the slack adjusting pin 412_b_ that exposes at an outer face side of the second outside panel 41. A slack of the tape T in the transfer device can be adjusted due to a rotation of the roll-up spool SP1 and the wind-off spool SP2 in conjunction with the rotation of the slack adjusting pin 412_b_ by rotating the slack adjusting pin 412_b_ with a nail of a finger, a coil or a distal end of a driver inserted into the adjusting groove. In addition, the sliding member 2 is mounted on the second outside panel 41 in a state of being capable of sliding movement along back and forth. In order to do so, slits 414 are formed at a center of the second outside panel 41 vertically in pairs.

The sliding member 2 is in a shape of an "L" character of elastic synthetic resin comprising a contacting plate portion 21 as being a plate-shaped contacting member having a contacting face 21_a_ that contacts along an outer face of the second outside panel 41 and a standing portion 22 that is provided to stand toward the cartridge 3 from a rear end portion of the contacting portion 21 and that has only one operating portion 221 with which a finger or the like can be hooked.

The outer face of the contacting plate portion 21 is arranged to be generally flat to the outer face of the second outside panel 41 and a concave portion 415 is formed to be dent corresponding to a shape of the contacting plate portion 21 at the surrounding of the slit 414 on the outer face of the second outside panel 41. Furthermore, the contacting plate portion 21 comprises a base portion 21_y_ locating at an opposite side to a side where the operating portion 221 is arranged, namely at the transfer head K side and an enlarged portion 21_x_ attached to the base portion 21_y_ to increase a width size than that of the base portion 21_y_. More concretely, the base portion 21_y_ is formed to be in a rectangle shape elongating toward a longitudinal direction of the transfer device A. The enlarged portion 21_x_ has a center around a mounting portion 412 of the wind-off gear G1 and is in a shape of a sector wherein an end edge locating at a side where the operating portion 221 is arranged is an arc, the maximum width size is formed to be bigger than a width of the base portion 21_y_. A long bore 21_s_ is formed to expose the pin head portion of the slack adjusting pin 412_b_ on the base portion 21_y_ at a portion close to the enlarged portion 21_x_.

A distal end of the standing portion 22 is made to project over the first outside panel 31 of the cartridge 3 so as to be the operating portion 221.

In this embodiment, a lock mechanism RR is further provided. The lock mechanism RR has an engaging portion 5 that is arranged between the case 4 and the sliding member 2 and that prohibits the sliding member 2 from making a sliding movement so as to hold the sliding member 2 at the above-mentioned engaging position by means of an concavo-convex engagement, and an engagement release mechanism 6 that releases the engaged state of the engaging portion 5 so as to allow the sliding member 2 to make the sliding movement by applying an operating force to the operating portion 221 toward a direction of the sliding movement from the engaged position to the pullout position and toward a direction different from the direction of the sliding movement at once.

More concretely, the engaging portion 5 comprises an engaging bore 21_b_ formed at the enlarged portion 21_x_ of the contacting plate portion 21 and an engaging projection 419 formed at a position corresponding to the engaging bore 21_b_ on the second outside panel 41 of the case 4 to project outward. The engaging projection 419 is so formed to narrow a projecting width from a center along a direction of the sliding movement toward both ends and toward a surrounding of the engaging projection 419. The engaging portion 5 prohibits the sliding member 2 from making the sliding movement so as to hold the sliding member at the engaged position by engaging the engaging bore 21*b* and the engaging projection 419 with the concavo-convex engagement.

Figure 6:
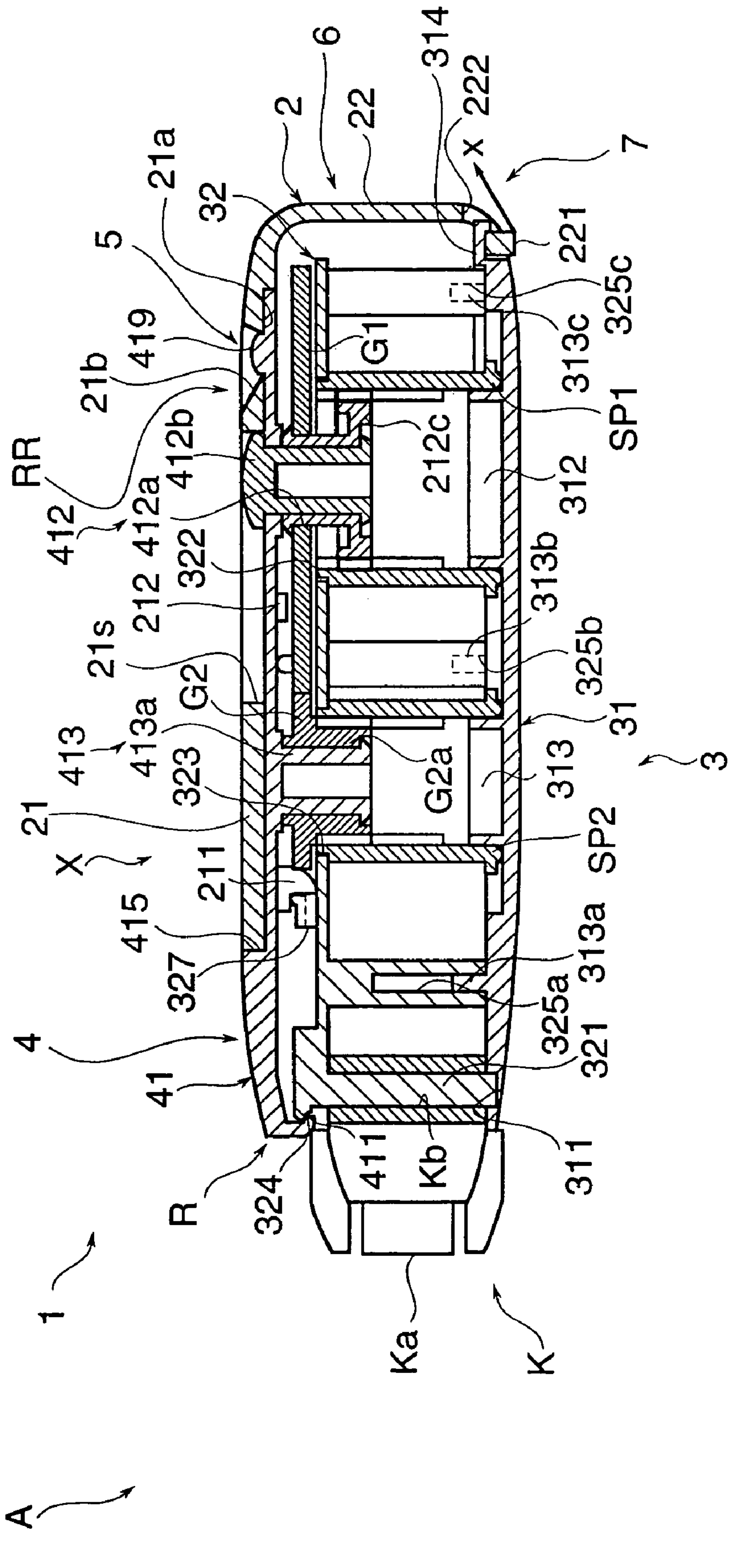
FIG. 6 is a cross-sectional view of the transfer device taken along a line VI-VI in FIG. 2.

When the operating portion 221 receives an operating force toward a direction of an arrow x in FIG. 6, the engagement release mechanism 6 is so arranged that the contacting plate portion 21 bends at a boundary portion between the enlarged portion 21*x* and the base portion 21*y*, the enlarged portion 21*x* as being a part of the sliding member 2 moves outward and also toward a direction orthogonal to the contacting face 21*a* so as to transform to be separated from the case 4, and then the concavo-convex engagement of the engaging bore 21*b* and the engaging projection 419 is released so as to allow the sliding member 2 to make the sliding movement from the engaged position toward the pullout position.

Furthermore, a second engaging portion 7 is arranged between the cartridge 3 and the sliding member 2 to prohibit the sliding member 2 from moving to a direction orthogonal to the contacting face 21*a* of the sliding member 2, outward in this embodiment, and to hold the sliding member 2 at the engaged position. The second engaging portion 7 comprises an engaging nail 314 formed at a rear end portion of the first outside panel 31 to project outward from the outside face of the first outside panel 31 and a second engaging bore 222 formed on the standing portion 22 in a manner that the engaging nail 314 can be engaged with the second engaging bore 222 or detached therefrom. The engaged state of the second engaging portion 7 can be released together with the engaging portion 5 by applying an operating force to the operating portion 221 toward a direction of the sliding movement from the engaged position to the pullout position and also toward a direction different from the direction of the sliding movement.

In addition, a separating mechanism X is arranged between the cartridge 3 and the sliding member 2. The separating mechanism X acts to separate the cartridge 3 from the case 4 in conjunction with the sliding movement of the sliding member 2 from the engaged position to the pullout position. A principal portion of the separating mechanism X comprises a pair of projecting portions 211 arranged vertically on the inner face side of the contacting plate portion 21 so as to be inserted into slits 414 arranged vertically on the case 4 and a pair of separation guiding portions 416 arranged vertically on the inside panel 32 to face the case 4 so as to be inserted into the slits 414. The separation guiding portion 416 is in a shape of a thin plate and forms a tapered face 416*a* inclining toward the front end portion side. In this embodiment the tapered face 416*a* is gently curved to form a partial arc. The separation guiding portion 416 is inserted into a longitudinal concave portion of the slit 414 arranged on a line that the projecting portion 211 makes the sliding movement so as to be in standby. The projecting portion 211 is in an unciform shape of a thin plate and forms a tapered face 211*a* inclining toward a rear end portion. The tapered face 211*a* is curved to form a partial arc corresponding to the tapered face 416*a* of the separation guiding portion 416. An accommodating portion 327 is formed to accommodate a distal end portion of the projecting portion 211 at a position corresponding to the projecting portion 211 on the outer face of the inside panel 32 in order to hold the sliding member 2 at a predetermined position when the transfer device A is in use. In this embodiment, the accommodating portion 327 is formed in a channel shape in a front view so as to accommodate the unciform shaped projecting portion 211.

A stopper portion ST is formed in association with the second outside panel 41 and the sliding member 2 in order to hold the sliding member 2 at the pullout position in a state that the cartridge 3 are separated from the case 4. The stopper portion ST comprises, as shown in FIG. 5, a pair of small projecting portions 212 arranged vertically to be inserted into vertically arranged a pair of the slits 214 at a position rearward to the projecting portion 211 of the sliding member 2, and an elastic supporting portion 418 formed along the slit 414 of the second outside panel 41. An extremely small projection 212*a* is formed on an inward facing surface of the small projecting portion 212. The elastic supporting portion 418 comprises an elastic chip 418*a* formed in an elastically transformable manner along an inner side of the slit 414, a stopper chip 418*b* formed at a rear end portion side of the elastic chip 418*a*, and a standing chip 418*c* standing between the elastic chip 418*a* and the stopper chip 418*b*. Especially, extremely small projections 418*a*1, 418*b*1 project toward inside the slit 414 at the rear end portion of the elastic chip 418*a* and the front end portion of the stopper chip 418*b*. When the sliding member 2 is moved to the pullout position, the projection 212*a* of the small projecting portion 212 in the slit 414 comes into collision with the projection 418*a*1 of the elastic chip 418*a* so as to bend the elastic chip 418*a* to open the slit 414 and the small projecting portions 212 are held between the rear end portion of the elastic chip 418*a*, the front end portion of the stopper chip 418*b* and the distal end portion of the standing chip 418*c* at a position climbing over the projection 418*a*.

A procedure to disassemble the body 1 in accordance with this embodiment will be explained with reference to FIG. 7. In exchanging a used tape T with a new tape T, a user puts his or her finger on the operating portion 221 of the sliding member 2 in a state of FIG. 7(*a*) and then applies an operating force to the operating portion 221 toward a direction shown by an arrow x in FIG. 7(*a*). At this time, since the operating portion 221 receives an action toward both a direction to which the sliding member 2 makes the sliding movement and a direction orthogonal to the contacting face 21*a*, the engagement release mechanism 6 acts so as to release engagement of the engaging portion 5 comprising the engaging bore 21*b* and the engaging projection 419 and to release engagement of the second engaging portion 7 comprising the engaging nail 314 and the second engaging bore 222, which allows the sliding member 2 to make the sliding movement. At the same time when the engagement release mechanism 6 starts to act, the projecting portion 211 starts to interfere with the separation guiding portion 416 inside the slit 414. Then the tapered face 211*a* of the projecting portion 211 makes an abutting contact with the tapered face 416*a* of the separation guiding portion 416, as shown in FIG. 7(*a*), which makes the sliding member 2 run on the inside panel 32 of the cartridge 3. Accompanied by this movement, the case 4 makes a rotating movement around the rotary mounting portion R at the front end portion together with the sliding member 2 and then the case 4 is separated from the cartridge 3 little by little. More specifically, the unciform projection 411 locating at the front end portion of the case 4 is hooked with the cutout portion 324 while the rear end portion of the case 4 is widely apart from the cartridge 3. The sliding member 2 is in a state held at the pullout position due to an action of the stopper portion ST. As a result, it is possible for the user to separate the cartridge

3 from the case 4 if only the user disengages the unciform projection 411 from the cutout portion 324. In addition, since the cartridge 3 holds the tape T and the transfer head K, if a used cartridge 3 is exchanged with a new cartridge 3 and a reverse operation to the above-mentioned procedure is conducted, the transfer device A can be made in a usable condition again. In this case, if the sliding member 2 is moved to slide from the pullout position to the engaged position, the engaging projection 419 engages with the engaging bore 21*b* each constituting the engaging portion 5 and also the second engaging nail 314 engages with the second engaging bore 222 each constituting the second engaging portion 22, which prohibits the sliding member 2 from making a sliding movement and holds the sliding member 2 at the engaged position. In this embodiment, in a state that the sliding member 2 is moved to slide from the engaged position to the pullout position, the cartridge 3 and the case 4 are engaged each other through the rotary mounting portion R as mentioned above, however, the rotary mounting portion R may not always be provided. In this case, a guiding portion may be provided between the cartridge 3 and the case 4 in order to guide the cartridge 3 and the case 4 to move toward a direction orthogonal to the first outside panel 31.

In accordance with the arrangement of the lock mechanism RR of the sliding member 2, if an operating force is applied to the operating portion 221 arranged at only one location toward a direction shown by the arrow x in FIG. 6, namely an operating force is applied toward a direction of the sliding movement from the engaged position to the pullout position and a direction different from the direction of the sliding movement at once, the engagement release mechanism 6 acts to release the engaged state of the engaging portion 5 so as to allow the sliding member 2 to make the sliding movement. Then it is possible for the user to operate the engagement release mechanism 6 to do a successive operation to release the engaged state of the engaging portion 5 so as to allow the sliding member 2 to make the sliding movement and to move the sliding member 2 to slide consecutively with one finger. More specifically, it is possible to operate the sliding member 2 without grasping to pinch the body 1 even though the body 1 can not be grasped by pinching such that only one finger is free.

In addition, since the separating mechanism X is provided between the cartridge 3 and the case 4 of the body 1 to separate the cartridge 3 from the case 4 in conjunction with the sliding movement of the sliding member 2 from the engaged position to the pullout position, it is possible to exchange the cartridge 3 with ease by operating the sliding member 2 to make the sliding movement with one finger so as to separate the cartridge 3 from the case 4.

Furthermore, since the sliding member 2 has the contacting plate portion 21 having the contacting face 21*a* that contacts along the case 4 of the body 1 and the standing portion 22 that stands from one end edge of the contacting plate portion 21 toward the cartridge 3, the distal end of the standing portion 22 is protruded over the first outside panel 31 of the cartridge 3 and the operating portion 221 is formed at the distal end of the standing portion 22, it is possible to apply a force to the operating portion 221 toward a direction orthogonal to the contacting face 21 with a finger so as to operate the operating portion 221. In addition, since the sliding member 2 rotates around an end portion of an opposite side to the side where the standing portion 22 of the contacting plate portion 21 is arranged due to this force, it is possible to release the concavo-convex engagement of the engaging portion 5 with a little operating force.

Furthermore, since the engaging projection 419 is formed in a such shape that a projecting width is narrowed from a center of a width along a direction of the sliding movement to both ends, it is possible to prevent a problem that the engaging projection 419 makes an abutting contact with the opening end edge of the engaging bore 21*b* and interferes the sliding member 2 from moving when an operating force is applied to the operating portion 221. This effect can also be obtained if the engaging projection 419 is made to have a projecting width narrowed from the center of the width along the direction of the sliding movement to both ends and extends toward a direction of the sliding movement and a direction orthogonal to the abutting face with keeping the same cross-sectional shape.

Especially, in this embodiment, since the engaging projection 419 is made to have a projecting width narrowed toward a circumference of the engaging projection 419, a material required to form the engaging projection 419 can be lessened.

In addition, since the contacting plate portion 21 of the sliding member 2 comprises the base portion 21*y* that is arranged continuously to the end portion locating at the transfer head K side of the enlarged portion 21*x* and the enlarged portion 21*x* arranged continuously to the base portion 21*y* and formed to have the width size bigger than that of the base portion 21*y*, and the engaging bore 21*b* constituting the engaging portion 5 is arranged on the enlarged portion 21*x*, the sliding member 2 is easily bent at the boundary portion 21*x* between the enlarged portion 21*x* and the base portion 21*y*, which makes it easy to separate the enlarged portion 21*x* where the engaging bore 21*b* is arranged from the case 4 of the body 1 toward a direction orthogonal to the contacting face 21*a* with a little operating force.

Since the second engaging portion 7 is arranged between the cartridge 3 of the body 1 and the sliding member 2 to prohibit the sliding member 2 from moving toward a direction orthogonal to the contacting face 21*a* that contacts along the case 4 and to hold the sliding member 2 at the engaged position and the engaged state of the engaging portion 5 and the engaged state of the second engaging portion 7 are released at the same time when the operating portion 221 receives both the operating force toward a direction of the sliding movement from the engaged position to the pullout position and the operating force toward a direction different from the direction of the sliding movement at once, it is possible to effectively avoid a problem that the sliding member 2 might move toward a direction orthogonal to the contacting face 21*x* and be disengaged, and it is also possible to release the engaged state of the engaging portion 5 and the engaged state of the second engaging portion 7 at once. As a result, it is possible to make an operation to release the engaged state of the sliding member 2 at the engaged position and to move to slide the sliding member 2 with ease.

The present claimed invention is not limited to the above-described embodiments.

For example, in the above-mentioned embodiment, the engaged portion 5 is formed by engaging the engaging bore 21*b* formed on the sliding member 2 and the engaging projection 419 formed on the case 4 of the body 1, however, it is a matter of course that the engaging portion may be formed by engaging an engaging projection formed at the sliding member 2 to project toward the body 1 and an engaging concave portion formed at the body 1 so as to engage with the engaging projection.

In addition, in the above-mentioned embodiment, the contacting plate portion 21 has the enlarged portion 21*x* and the base 21*y*, however, whole of the contacting plate portion 21 may be formed in a rectangle shape extending toward a longitudinal direction of the transfer device A as far as the contacting plate portion 21 is flexible. In this case also, the sliding member 2 is allowed to make a sliding movement by activating the engagement release mechanism 6 with an operation to the operating portion 221.

Furthermore, in the above-mentioned embodiment, the engaging nail 314 of the second engaging portion 7 is fixed and the engaged state of the engaging nail 314 and the second engaging bore 222 locating on the sliding member 2 can be released with an operation to the operating portion 221 to activate the engagement release mechanism 6, however, other arrangement to prohibit the sliding member 2 from moving toward a direction orthogonal to the direction of the sliding movement may be adopted. For example, in stead of the above-mentioned engaging nail 314, it is conceived that an engaging nail that is so arranged to be able to project and retract in conjunction with a sliding switch that can be operated with a finger is arranged on the cartridge 3, a second engaging portion may be formed by engaging the engaging nail and the second engaging bore 222 locating on the sliding member 2 and an engaged state of the second engaging portion can be released with an operation of the sliding switch. In accordance with the arrangement, since it is also possible to release the engaged state of the second engaging portion with an operation of the sliding switch that can be operated with one finger, a consecutive operation to activate the engagement release mechanism 6 can be done with one finger and the sliding member 2 can be operated to make the sliding movement from the engaged position to the pullout position with one finger as well.

Figure 8:
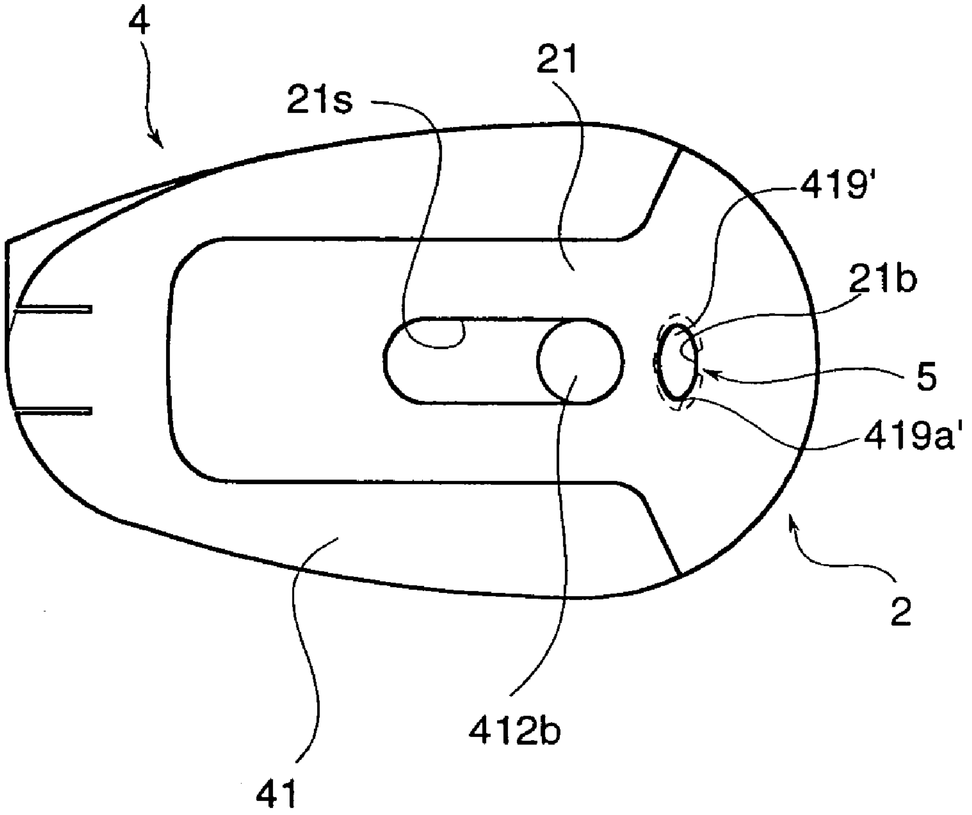
FIG. 8 is a pattern diagram showing an outer side face of a case and a sliding member of a transfer device in accordance with another embodiment of the present claimed invention.
Figure 9:
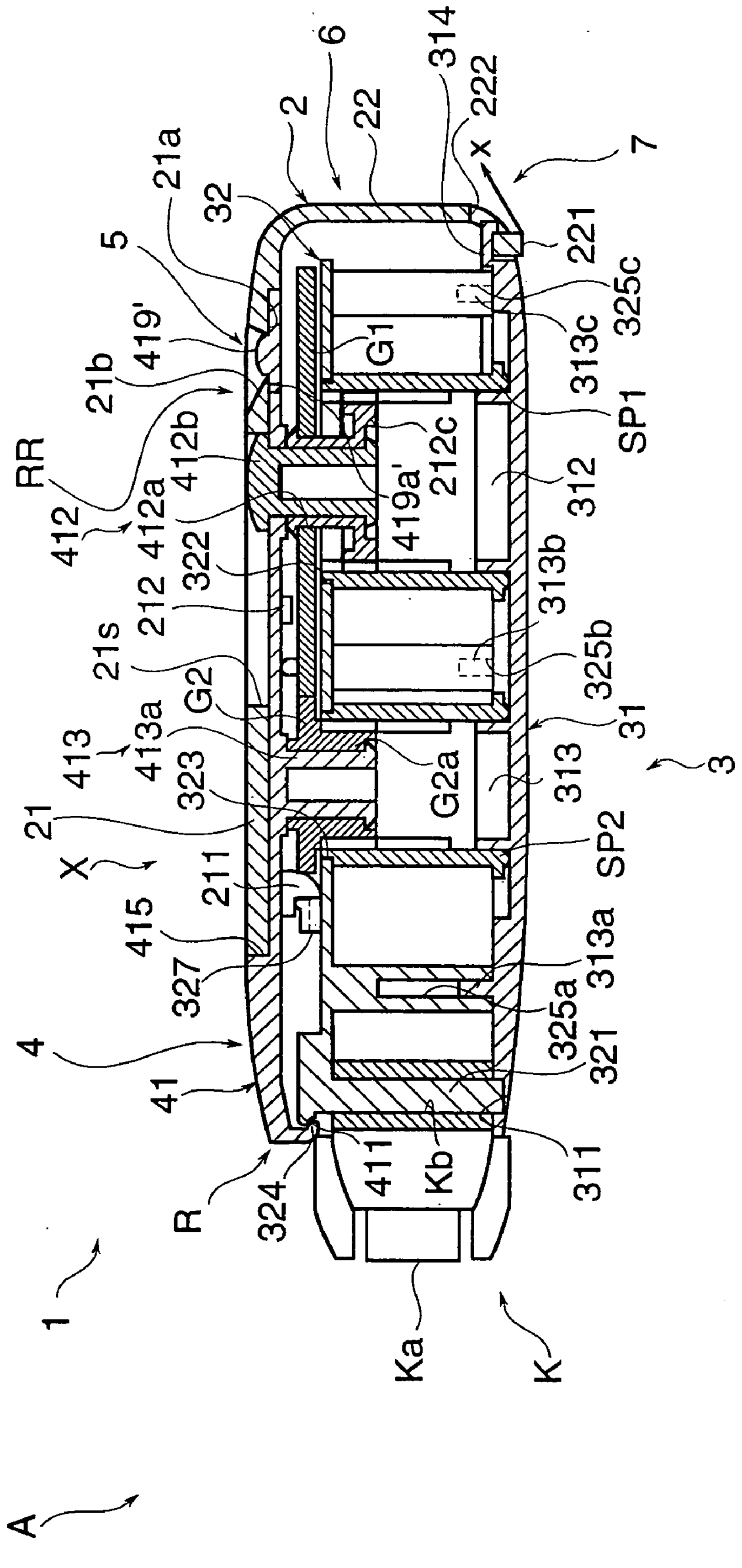
FIG. 9 a pattern diagram showing a center cross-sectional view of the case and the sliding member of the transfer device in accordance with another embodiment of the present claimed invention.

In addition, in the above-mentioned embodiment, as a pattern diagram of an outer side face in a state that the sliding member 2 is mounted on the case 4 is shown in FIG. 8 and a pattern diagram of a center cross-sectional end face thereof is shown in FIG. 9, an engaging projection 419' may be provided that is elastically supported by one side of the second outside panel 41 of the case 4 instead of the above-mentioned engaging projection 419. More concretely, a ring-shaped go-around groove 419*a*' whose one side at the operating portion 221 side is open is formed around the engaging projection 419' and the engaging projection 419' is elastically supported by one side of the second outside panel 41 locating at the operating portion 221 side. In accordance with the arrangement, since the engaging projection 419' moves toward a direction of receding from the sliding member 2 when an opening edge of the engaging bore 21*b* makes an abutting contact with the engaging projection 419' in conjunction with the sliding movement of the sliding member 2, it is possible to effectively avoid a problem that the engaging projection 419' makes an abutting contact with the opening end edge of the engaging bore 21*b* and interferes the sliding member 2 from moving when an operating force is applied to the operating portion 221.

The lock mechanism of the sliding member as mentioned above can be applied to general sliding members mounted on a body as being an object to be mounted in a slidably movable manner.

For example, in case that the body is storage furniture and the sliding member is a drawer that can be moved to slide back and forth between an engaged position as being a position where a storage space formed inside the drawer is completely concealed and a pullout position as being a position where the drawer is pulled out at the most forward, the lock mechanism of the sliding member can be applied to an arrangement to hold the drawer at a predetermined stored position. The lock mechanism can be realized if a bottom portion of the drawer is made of an elastic material, and the drawer and the body are arranged as follows. More specifically, the above-mentioned lock mechanism can be realized if the engaging portion comprising an engaging bore arranged on a bottom face of the drawer and an engaging projection projecting outward arranged on the body at a position corresponding to the engaging bore prohibits the drawer from making a sliding movement and that holds the drawer at a predetermined storage position by means of a concavo-convex engagement of the engaging bore and the engaging projection, and an engagement release mechanism that releases the engaged state of the engaging portion and that allows the drawer to make the sliding movement by applying an operating force to an operating portion arranged at only one portion to project downward from a bottom end portion of a panel board constituting a front face are formed.

Figure 10:
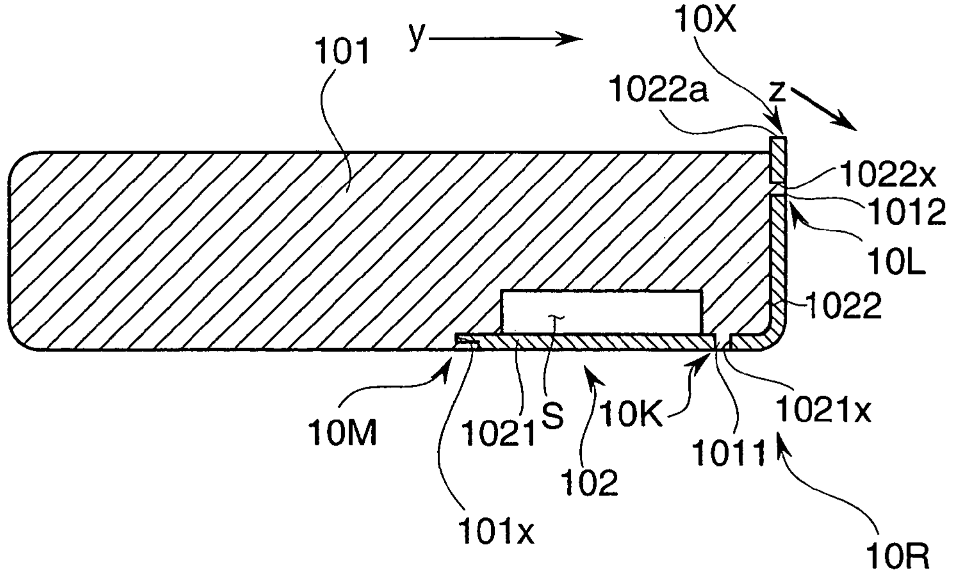
FIG. 10(*a*), FIG. 10(*b*), FIG. 10(*c*), and FIG. 10(*d*) are views of an electric appliance on which a battery cover is mounted and the battery cover in accordance with the embodiment.
Figure 10:
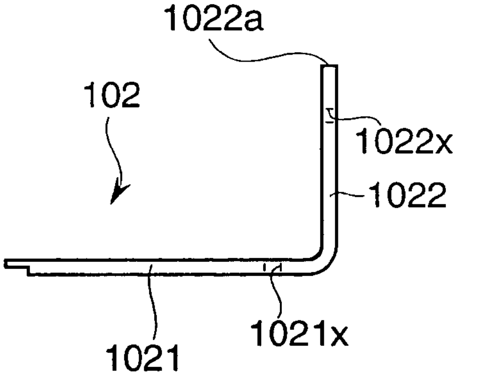
Figure 10:
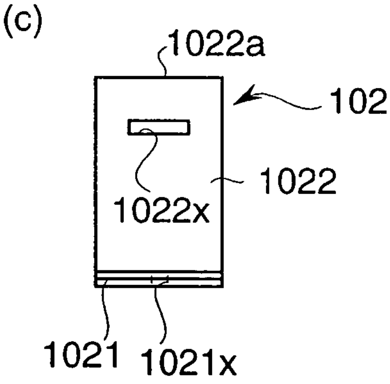
Figure 10:
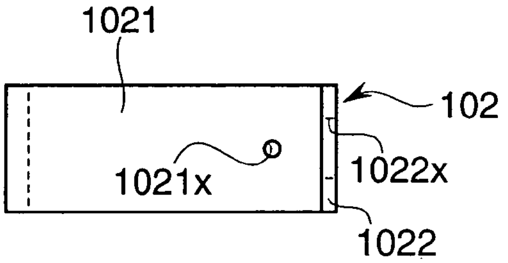

In addition, as shown in FIG. 10, in case that the body is an electric appliance 101 that is activated by electrical power supplied by a battery, a space for battery storage S is formed in the electric appliance 101 and the space for battery storage S is covered by a battery cover 102 as being the sliding member, the lock mechanism of the present claimed invention may be applied to an arrangement to mount the battery cover 102 on the electric appliance 101 in a slidably movable manner between an engaged position and a pullout position wherein the battery cover 102 is completely separated from the electric appliance 101 shown in FIG. 10(*a*).

In this embodiment, the battery cover 102 comprises, whose front view is shown in FIG. 10(*b*), whose side view is shown in FIG. 10(*c*) and whose plane view is shown in FIG. 10(*d*), a general rectangle contacting plate portion 1021 that contacts along a bottom face of the electric appliance 101, and a standing portion 1022 that is arranged to stand at one end edge along a longitudinal direction of the contacting plate portion 1021 and that makes an abutting contact with a side face of the electric appliance 101 and at a distal end of which an operating portion 1022*a* is formed to project over an upper face of the electric appliance 101. The battery cover 102 is so arranged that an end edge extending toward a longitudinal direction of the contacting plate portion 1021 fits into a guiding groove, not shown in drawings, arranged on the electric appliance 101 and is guided to allow a sliding movement toward a direction shown by an arrow y in FIG. 10 and its opposite direction by the end edge extending toward the longitudinal direction of the battery cover 102 and the guiding groove.

Then a lock mechanism 10R comprising an engaging portion 10K that prohibits the battery cover 102 from making a sliding movement by means of a concavo-convex engagement, and an engagement release mechanism 10X that releases the engaged state of the engaging portion 10K by applying an operating force to the operating portion 1022*a* toward a direction of the sliding movement and a direction different from the direction of the sliding movement at once so as to allow the battery cover 102 to make a sliding movement is arranged between the battery cover 102 and the electric appliance 101.

More concretely, the engaging portion 10K is an arrangement of a concavo-convex engagement of an engaging bore 1021*x* that is arranged on the contacting plate portion 1021 and an engaging projection 1011 that is arranged on a bottom face of the electric appliance 101 and that can make an engagement with the engaging bore 1021*x*.

A second engaging portion 10L comprising a second engaging bore 1022*x* arranged on the standing portion 1022 of the battery cover 102 and a second engaging projection 1012 arranged on the electric appliance 101 and that can be engaged with the second engaging bore 1022*x*, and a third engaging portion 10M wherein a distal end portion of the contacting plate portion 1021 is inserted into a concave portion 101*x* arranged on the electric appliance 101 are used in order to latch the battery cover 102A.

When an operating force is applied to the operating portion 1022*a* toward a direction of the sliding movement and a direction different from the direction of the sliding movement at once, more concretely toward a direction of an arrow z in FIG. 10, the engagement release mechanism 10X acts so as to allow the battery cover 102 to make a sliding movement. More concretely, the contacting plate portion 1021 of the battery cover 102 makes a rotary movement by making use of the third engaging portion 10M as a fulcrum and an engaged state of the engaging portion 10K, namely, an engaged state of the engaging projection 1011 and the engaging bore 1021 is released. At the same time, an engaged state of the second engaging portion 10L, namely, an engaged state of the second engaging projection 1012 and the second engaging bore 1022*x* is also released. In addition, when an operating force is consecutively applied to the operating portion 1022*a* toward a direction of the sliding movement, the battery cover 102 is separated from the electric appliance 101 so as to expose the space for battery storage S, which makes it possible to exchange a battery.

In case of mounting the battery cover 102 on the electric appliance 101, the battery cover 102 can also be dismounted with one finger by conducting the above-mentioned operation to the operating portion 1022*a* arranged on only one portion of the battery cover 102.

Other concrete arrangement is not limited to the above embodiments and may be variously modified without departing from the spirit of the invention.

In accordance with the lock arrangement of the sliding member of the present claimed invention, since the operating portion that receives an operating force to actuate the engagement release mechanism and an operating force to slidably move the sliding member is arranged at only one location, it is possible for a user to do a successive operation to release the engaged state of the engaging portion so as to allow the sliding member to make a sliding movement and to move the sliding member to slide consecutively with one finger by actuating the engagement release mechanism with applying an operating force toward a direction of the sliding movement from the engaged position to the pullout position and an operating force toward a direction different from the direction of the sliding movement at once. As a result, it is possible to operate the sliding member without grasping to pinch the body even though the body cannot be grasped to pinch because only one finger is free. More specifically, it is possible to dismount a cartridge of the transfer device from a case that accommodates the cartridge or to dismount a cap body of a battery case that makes use of the sliding member from a body on which the cap body is mounted with one finger in conjunction with an operation of the sliding member. In addition, if a lock mechanism that engages a drawer as being the sliding member at a predetermined engaging position adopts a lock arrangement of the sliding member, it is possible to release the engaged state of the drawer with ease and to get goods stored in the drawer with ease.

The invention claimed is:

1. A lock mechanism of a sliding member, the sliding member mounted on a body, the sliding member being slidably movable along the body between an engaged position and a pullout position, the sliding member comprising a contacting portion having a face, the face contacting along an outer face of the body and extending in a direction of sliding, wherein the lock mechanism comprises an engaging portion located between the body and the sliding member that prohibits the sliding member from making a sliding movement by holding the sliding member at the engaged position by a concavo-convex engagement, and an engagement release mechanism that releases the engagement of the engaging portion, when an operating force is applied to an operating portion located on the sliding member, to allow the sliding member to make a sliding movement from the engaged position to the pullout position along a direction of a sliding movement and in a direction different from the direction of the sliding movement simultaneously; the operating force including a component parallel to the direction of sliding and a component in a direction orthogonal to the contacting face, wherein the contacting face separates from the outer face of the body.

2. The lock mechanism of the sliding member described in claim 1 wherein the sliding member has a standing portion arranged to stand from an end edge of the contacting portion, wherein a distal end of the standing portion projects over the body, and the operating portion is formed at the distal end of the standing portion.

3. A transfer device comprising a body having a cartridge that holds a transferring material to be transferred to an object and a transfer head to contact the transferring material with the object and a case that accommodates the cartridge, and a sliding member mounted between an engaged position and a pullout position in a slidably movable manner with contacting along the case of the body, the sliding member further comprising a lock mechanism having an engaging portion positioned between the case of the body and the sliding member and that prohibits the sliding member from making a sliding movement, by holding the sliding member at the engaged position with a concavo-convex engagement, and an engagement release mechanism that releases the engagement of the engaging portion allowing the sliding member to make a sliding movement by applying an operating force to an operating portion on only one location of the sliding member from the engaged position toward the pullout position along a direction of a sliding movement and toward a direction different from the direction of the sliding movement simultaneously; wherein the sliding member has a contacting portion having a contacting face contacting along an outer face of the case and extending in a direction of sliding; wherein the engagement of the engaging portion is released by applying to the operating portion an operating force including a component in parallel in the direction of sliding and a component in a direction orthogonal to the contacting face and wherein the contacting face separates from the outer face of the case.

4. The transfer device described in claim 3 further comprising a separating mechanism between the cartridge of the body and the sliding member and that operates to separate the cartridge from the case with the sliding movement of the sliding member from the engaged position to the pullout position.

5. The transfer device described in claim 3 wherein the sliding member has a standing portion arranged to stand from an end edge of the contacting portion in a direction of the cartridge, wherein a distal end of the standing portion projects over the cartridge, and the operating portion is formed at the distal end of the standing portion.

6. The transfer device described in claim 3 wherein the engaging portion comprises an engaging bore formed on the sliding member, and an engaging projection formed on the case to project outward at a position corresponding to the engaging bore.

7. The transfer device described in claim 6 and wherein a projecting width of the engaging projection is narrowed from a center of a direction of the sliding movement toward both ends.

8. The transfer device described in claim 7 wherein a projecting width of the engaging projection is narrowed toward an edge of the engaging projection.

9. The transfer device described in claim 6 wherein the engaging projection is elastically supported by one side of an outside panel forming an outer face of the case.

10. The transfer device described in claim 3 wherein the engagement release mechanism releases the engaged state of the engaging portion to allow the sliding member to make a sliding movement from the engaged position to the pullout position by separating at least a part of the sliding member from the case both outward and in a direction orthogonal to the contacting face that contacts along the case of the body when the operating portion receives the operating force.

11. The transfer device described in claim 6 wherein the engagement release mechanism releases the engaged state of the engaging portion to allow the sliding member to make a sliding movement from the engaged position to the pullout position by separating at least a part of the sliding member from the case both outward and in a direction orthogonal to the contacting face that contacts along the case of the body when the operating portion receives the operating force.

12. The transfer device described in claim 10 wherein the engagement release mechanism uses a bending transformation of the sliding member.

13. The transfer device described in claim 12 wherein the contacting portion of the sliding member is plate shaped and comprises a base portion at a position contrary to a side where the operating portion is arranged, and an enlarged portion attached to the base portion and a width bigger than that of the base portion, and the engagement release mechanism uses an outward movement of the enlarged portion by bending transformation of a boundary portion between the enlarged portion and the base portion.

14. The transfer device described in claim 13 wherein the engaging portion is arranged at the enlarged portion side.

15. The transfer device described in claim 3 wherein the lock mechanism further comprises a second engaging portion arranged between the cartridge of the body and the sliding member to prohibit the sliding member from moving in a direction orthogonal to the contacting face that contacts along the case to hold the sliding member at the engaged position by a concavo-convex engagement, and the engaged state of the engaging portion and the engaged state of the second engaging portion are released at the same time when the operating portion receives an operating force along a direction of the sliding movement from the engaged position to the pullout position and an operating force toward a direction different from the direction of the sliding movement at once.

16. The transfer device described in claim 6 wherein the lock mechanism further comprises a second engaging portion between the cartridge of the body and the sliding member to prohibit the sliding member from moving in a direction orthogonal to the contacting face that contacts along the case to hold the sliding member at the engaged position by a concavo-convex engagement, and engagement of the engaging portion and engagement of the second engaging portion are released at the same time when the operating portion receives an operating force along a direction of the sliding movement from the engaged position to the pullout position and an operating force in a direction different from the direction of the sliding movement at once.

17. The transfer device described in claim 10 wherein the lock mechanism further comprises a second engaging portion between the cartridge of the body and the sliding member to prohibit the sliding member from moving in a direction orthogonal to the contacting face that contacts along the case to hold the sliding member at the engaged position by a concavo-convex engagement, and engagement of the engaging portion and engagement of the second engaging portion are released at the same time when the operating portion receives an operating force along a direction of the sliding movement from the engaged position to the pullout position and an operating force in a direction different from the direction of the sliding movement at once.

18. The transfer device described in claim 15 wherein the second engaging portion comprises an engaging nail projecting outward relative to an outer face of the cartridge of the body, and the sliding member comprises a second engaging bore, the second engaging bore engaged with or disengaged from the engaging nail.

19. The transfer device described in claim 16 wherein the second engaging portion comprises an engaging nail projecting outward relative to an outer face of the cartridge of the body, and the sliding member comprises a second engaging bore, the second engaging bore engaged with or disengaged from the engaging nail.

20. The transfer device described in claim 17 wherein the second engaging portion comprises an engaging nail projecting outward relative to an outer face of the cartridge of the body, and the sliding member comprises a second engaging bore, the second engaging bore engaged with or disengaged from the engaging nail.

* * * * *